United States Patent [19]

Cowpland et al.

[11] 3,787,739

[45] Jan. 22, 1974

[54] COUPLER CIRCUIT FOR TELEPHONE NETWORKS AND THE LIKE

[75] Inventors: Michael C. J. Cowpland; Feyyaz I. Zambakoglu, both of Ottawa, Ontario, Canada

[73] Assignee: Microsystems International Limited, Montreal, Quebec, Canada

[22] Filed: Dec. 29, 1972

[21] Appl. No.: 319,334

[52] U.S. Cl. .................................................. 307/255

[51] Int. Cl. .............................................. H03k 17/00

[58] Field of Search 307/255, 263, 252 W, 231, 243

[56] References Cited

UNITED STATES PATENTS

| | | | |
|---|---|---|---|
| 3,619,658 | 11/1971 | Pranty | 307/255 |
| 3,267,290 | 8/1966 | Diebold | 307/263 |
| 3,254,236 | 5/1966 | Mena | 307/252 W |
| 3,263,128 | 7/1966 | White | 307/252 |

OTHER PUBLICATIONS

G. E. Application Note 90.6 Use of Complementary Transistors in Switching Circuits by R. Stasior 5/62 pgs. 4 & 5.

*Primary Examiner*—John S. Heyman
*Assistant Examiner*—B. P. Davis

[57] ABSTRACT

The present invention relates to a coupler circuit for insertion between a power supply circuit and a subscriber circuit connected thereto — particularly between a telephone line and a telephone set. The coupler is characterized by a thyristor-type transistor combination, the base of the second transistor of which is clamped through a breakdown device to a predetermined potential.

8 Claims, 2 Drawing Figures

COUPLER CIRCUIT FOR TELEPHONE NETWORKS AND THE LIKE

The present invention relates to a coupler circuit for insertion between a power supply circuit and a subscriber circuit connected thereto — particularly between a telephone line and a telephone set.

Various ways have been devised for protecting a telephone line from high voltages derived from illegal or faulty subscriber equipment and for also protecting the subscriber equipment from high-voltage surges on the line. Typically, the highest voltage from subscriber equipment which can be tolerated upon the telephone line, and vice versa, is of the order of 80 volts (with respect to ground) if customer supplied equipment is allowed. Now the ringing voltage for a telephone is of the order of 200 volts peak (including Central Office battery voltage of about 48 volts), and any protective circuit must not clamp the ringing signal on the line or the Central Office relays will be operated prematurely, since the increased current simulates the telephone set going "off-hook."

The circuit of the present invention functions to limit the peak voltage of 200 volts appearing at the input terminals to give an output of 80 volts. These values are, of course, simply representative of typical voltages employed in North American telephone systems, but generally, the function of the circuit is to permit relatively high peak ringing voltages at the network side of the circuit and to limit such voltages to a substantially lower, safe level at the subscriber side of the circuit.

Thus according to the invention we provide a coupler circuit havng first and second terminal means, said first terminal means connected sequentially through a first transistor and a series connected resistive means to the base electrode of a second transistor, said first and second transistors being complementary, the base electrode of said first transistor connected through said second transistor to said second terminal means and breakdown means connected between said base electrode of said second transistor and means for connection to a reference ground potential, said breakdown means having a predetermined breakdown voltage to which said base electrode of said second transistor is clamped.

The invention will now be described further by way of example only and with reference to the accompanying drawings, wherein.

Figure 1:
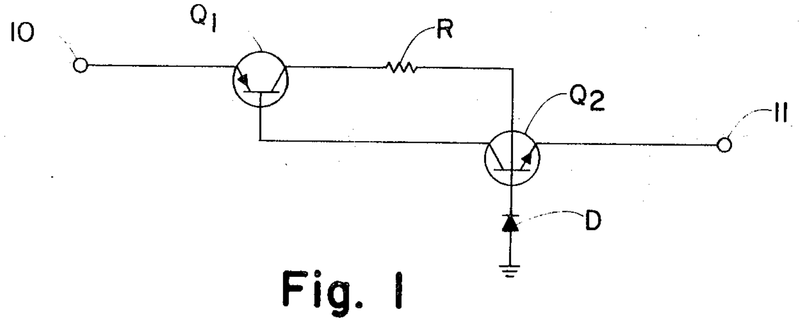
FIG. 1 is a schematic diagram of a circuit according to the invention.

Referring now to FIG. 1 of the drawings, the circuit comprises a first terminal 10 for connection to one side of a telephone line and a second terminal 11 for connection to one side of a telephone set. The circuit includes complementary transistors $Q_1$ and $Q_2$, the base of $Q_1$ being connected to the collector of $Q_2$ and the base of $Q_2$ being connected through a resistor R to the collector of $Q_1$. In this example $Q_1$ is a PNP transistor and $Q_2$ an NPN transistor, but it could equally well be vice versa — depending upon the voltage polarity of the terminals 10 and 11 with respect to reference ground potential. Connected to the base of $Q_2$ is a diode D having a predetermined breakdown voltage. The base of $Q_2$ is connected to a reference ground potential point through diode D, so that the base of $Q_2$ — and therefore terminal 11 — is clamped to the breakdown voltage of diode D and this is chosen to be the maximum potential allowed at terminal 11. Let this potential be $V_{BR}$. Now, a potential appears at terminal 10 having a peak of, say, $V_{PEAK}$, this voltage being considerably higher than $V_{BR}$. It is essential that the magnitude of $V_{PEAK}$ should not be brought down to that of $V_{BR}$ by the clamping action of the diode D. This is achieved as follows. The potential $V_{PEAK}$ appears at the collector of $Q_2$, minus the $V_{eb}$ of transistor $Q_1$ (which is small). There is noise at the base of $Q_2$, and $Q_1$ and $Q_2$ effectively form a modified thyristor-type circuit, whereby transistors $Q_2$ and $Q_1$ conduct so as to operate in their linear mode. Now the base of $Q_2$ is clamped to $V_{BR}$ and since the $V_{be}$ of $Q_2$ is small (a diode drop) terminal 11 is essentially clamped to this potential. If the base of $Q_2$ were connected directly to the collector of $Q_1$, this collector would be pulled down to the potential of the $Q_2$ base — i.e. to $V_{BR}$. If this happened, terminal 10 would be pulled down to this potential and the current flowing in the telephone line would correspondingly increase. The increased current flow would pull in the relays in the Central Office since it would appear the same as if the telephone set had gone "off-hook." Thus it is essential that the terminal 10 not be clamped to $V_{BR}$ but allowed to swing to $V_{PEAK}$. This is achieved by insertion of the resistor R between the $Q_1$ collector and $Q_2$ base — the potential drop across R being approximately ($V_{PEAK} - V_{BR}$). This potential drop ($V_{PEAK}$ 13 $V_{BR}$) will also appear across the collector and emitter junctions of the transistor $Q_2$ .

Figure 2:
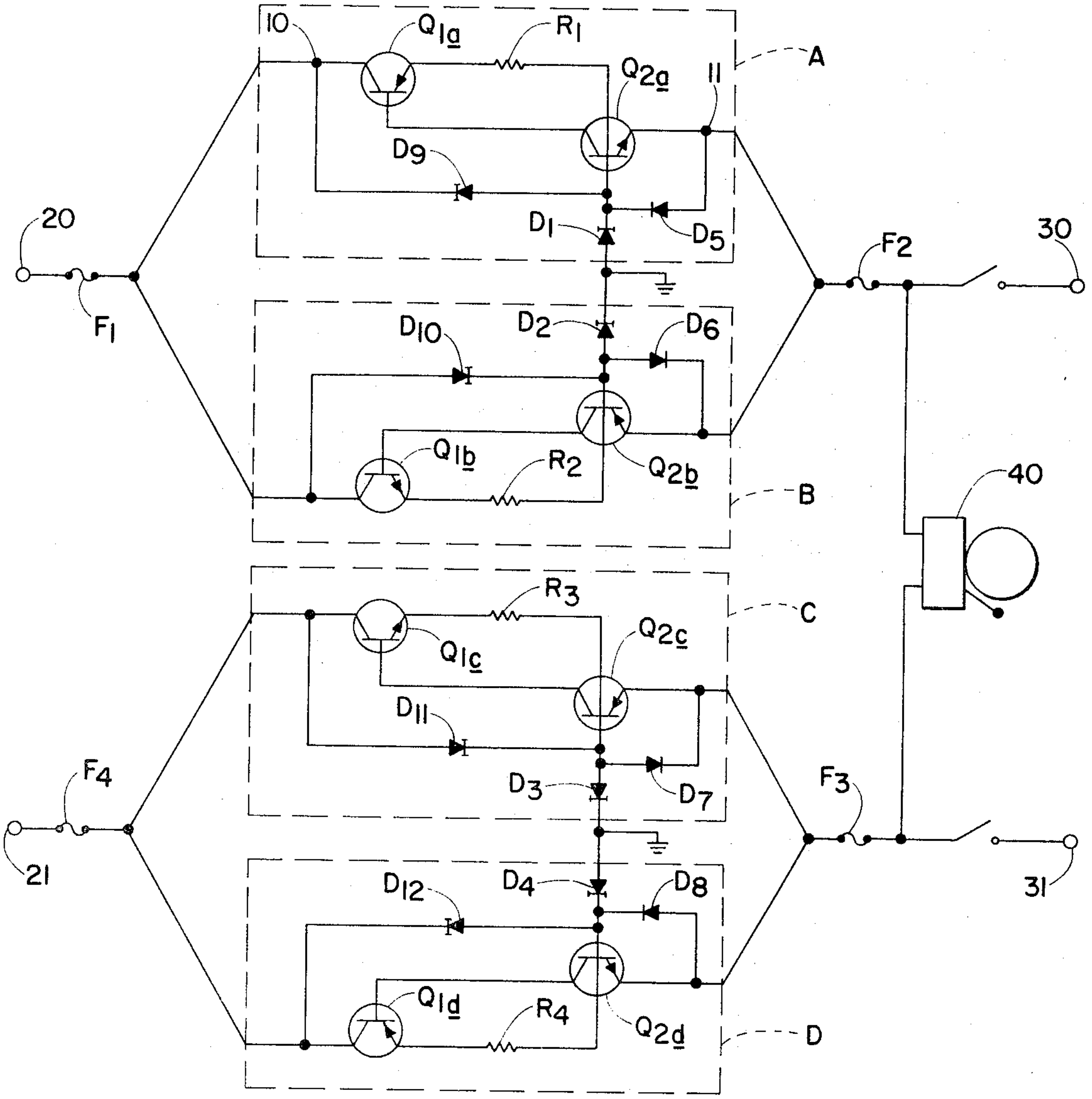
FIG. 2 is a schematic diagram of a complete coupler device embodying the circuit of FIG. 1.

The other current path between terminal 10 and the base of $Q_2$ is through the base-collector junction of $Q_2$ and the base-emitter junction of $Q_1$. Assuming terminal 10 more positive than the base of $Q_2$, the base-collector junction of $Q_2$ has a high breakdown voltage in this mode and there is sufficient potential drop thereacross to prevent pull-down of terminal 10 to the $Q_2$ base potential Assume now that terminal 10 is negative with respect to the $Q_2$ base potential. In this mode, transistor $Q_2$ would be PNP-type and transistor $Q_1$ NPN-type. Thus the base-collector junction of $Q_2$ would now have a low breakdown potential and the high potential drop therefore has to be across the base-emitter junction of $Q_1$. In practice, one particularly effective way of achieving this high breakdown voltage, without requirement for an exceptionally rated transistor, is to reverse the emitter/collector connections of $Q_1$ as shown in FIG. 2. Now the drop between the collector of $Q_2$ and terminal 10 is across the base-collector junction of $Q_1$, which is inherently of high value. Of course, the gain of the thyristor combination $Q_1/Q_2$ will be drastically reduced by this reversal but since $Q_2$ is operating in high-gain mode and the total gain of the circuit need only be unity, this is not a problem.

Referring now to FIG. 2, a complete coupler based upon the circuit of FIG. 1 is shown. The coupler has terminals 20 and 21 for connection across a telephone line and terminals 30 and 31 for connection across the speech network of a telephone.

The coupler is comprised essentially of four circuit blocks A, B, C and D, each of which is substantially the same as that of FIG. 1. The clamping diode D of FIG. 1 is a four-layer diode $D_1$, $D_2$, $D_3$ or $D_4$ in each of the respective circuit blocks of FIG. 2. A four-layer diode $D_9$, $D_{10}$, $D_{11}$ or $D_{12}$ is also provided between the base of $Q_2$ and the emitter of $Q_1$ and a low-threshold diode $D_5$, $D_6$, $D_7$ or $D_8$ is provided across the base-emitter junction of transistor $Q_2$ in each respective circuit block. The purpose of these additional components will hereinafter become apparent.

The collectors of $Q_{1a}$ and $Q_{1b}$ are interconnected and connected through a fuse $F_1$ to terminal 20. The emitters of $Q_{2a}$ and $Q_{2b}$ are interconnected and connected through a fuse $F_2$ to one side of telephone receiver ringer (in this case, specifically, a bell) 40. The other side of the ringer 40 is connected through a fuse $F_3$ to the emitter of each of $Q_{2c}$ and $Q_{2d}$ — which emitters are interconnected. The collectors of $Q_{1c}$ and $Q_{1d}$ are interconnected and connected through a fuse $F_4$ to terminal 21. Between the terminal 30 and one side of the ringer 40 $Q_{a\ switch\ S1}$ and between the terminal 31 and one side of the ringer 40 is a second switch $S_2$ these switches being the hook-switch of the telephone receiver. and fuse The coupler functions as follows. Suppose a ringing signal appears across terminals 20 and 21. When the polarity is such that terminal 20 is positive and terminal 21 is negative, current passes from terminal 20 through fuse $F_1$, through PNP transistor -$Q_{1a}$ and NPN transistor $Q_{2a}$ and through fuse $F_2$ to ringer 40. The return path from the ringer 40 is through fuse $F_3$, PNP transistor $Q_{2c}$, NPN transistor $Q_{1c}$ and through fuse $F_4$ to terminal 21. If the polarity of the potentials at terminals 20 and 21 is reversed, the current path is now through fuse $F_4$, through block D AND FUSE $F_3$ to the ringer 40. The return path is through $F_2$, block B and $F_1$ to terminal 20.

The functions of the diodes $D_9$ to $D_{12}$ inclusive are entirely analogous and will be described with reference to diode $D_9$, which is present to protect the collector base junction of transistor $Q_{1a}$. Thus, if a particularly high current surge appears on the telephone line (higher than $V_{PEAK}$), it is hoped that fuse $F_1$ would protect blocks A and B and, similarly, $F_2$ would protect blocks C and D. However, if $F_1$ fails to blow quickly enough, a destructive potential could appear at the collector of $Q_{1a}$. To meet this contingency, diode $D_9$ is inserted in order to bleed off this destructive potential appearing at the -$Q_{1a}$ collector to ground via diodes $D_9$ and $D_1$. Diode $D_9$ has a breakdown voltage such that the $V_{BR}$ of $D_9$ plus the $V_{BR}$ OF $D_1$ is higher than the peak voltage $V_{PEAK}$ appearing at terminal 20, so that $V_{PEAK}$ is not limited by breakdown across the $D_9/D_1$ path but is absorbed by the junctions by transistor $Q_1$ and $Q_2$ is aforesaid. In this example, four-layer devices are used for diodes $D_9$ to $D_{12}$ — and also for diodes $D_1$ to $D_4$ — because of the high-breakdown potentials which can conveniently be realized with such devices. However, other high-breakdown devices — such as metal oxide varistors — also having high-breakdown potentials, may equally well be used.

The functions of diodes $D_5$ to $D_8$ which are conventional (not breakdown) type diodes are entirely analogous and will be described with reference to diode $D_5$, which is present to protect the emitter-base junction of $Q_{2a}$. Thus, if a high charge appears at the emitter of $Q_{2a}$ due to failure of fuse $F_2$ to blow, the emitter base reverse voltage of transistor $Q_{2a}$ is limited by diode $D_5$ and the peak voltage (with respect to ground) appearing at the second terminal 11 is limited by diode $D_5$ in combination with diode $D_1$.

Various alternatives and modifications to the embodiments disclosed herein will be readily apparent to those skilled in the art without departing from the spirit and scope of the invention as described by the disclosure and defined by the claims appended hereto.

What is claimed is:

1. A coupler circuit, for protecting a telephone set against voltage transients appearing on a telephone line connected to said telephone set, said coupler circuit having a first terminal for connection to the telephone line, a second terminal for connection to a line terminal of the telephone set, and a third terminal for connection to ground potential, said coupler circuit comprising in combination;

a. a first transistor and a second transistor, said first and second transistors being complementary transistors, the collector electrode of the first transistor being connected to said first terminal, the emitter electrode of the second transistor being connected to the second terminal and the base electrode of the first transistor being connected to the collector electrode of the second transistor;

b. a resistive means connecting the emitter electrode of the first transistor to the base electrode of the second transistor;

c. a first breakdown diode means, having a first predetermined breakdown voltage, connecting the third terminal to the base electrode of the second transistor so as to clamp the base electrode of said second transistor at a voltage level, with respect to ground potential, corresponding to the first predetermined breakdown voltage;

whereby when a signal voltage, of a magnitude greater than the first predetermined voltage, appears across the first and third terminals, the first resistive means and the collector emitter junctions of the first and second transistors absorb the portion of said signal voltage in excess of the first predetermined breakdown voltage so as to limit the voltage appearing across the second and third terminals at a level corresponding to the first predetermined breakdown voltage while minimizing the flow of signal current via the first and third terminals.

2. The coupler circuit of claim 1 further comprising a second breakdown diode means connected between said first terminal and the base electrode of said second transistor and a third diode means connected between said second terminal and the base electrode of said second transistor, said second breakdown diode means having a predetermined breakdown voltage, the magnitude of which is greater than or equal to the usual potential drop appearing across the transistor junctions across which said second breakdown diode means is connected but lesser in magnitude than the minimum voltage which would be destructive to said junctions.

3. The coupler circuit of claim 1 wherein said first breakdown diode means comprises a four-layer breakdown diode.

4. The coupler circuit of claim 1 wherein said first breakdown diode means comprises a metal oxide varistor.

5. The coupler circuit of claim 1 wherein said first and second breakdown diode means each comprise a four-layer breakdown diode and said resistive means is a resistor.

6. The coupler circuit of claim 2 wherein said first and second breakdown diode means each comprise a metal oxide varistor and said resistive means is a resistor.

7. The coupler circuit of claim 5 wherein said third diode means is a diode.

8. In combination, first and second coupler circuits as claimed in claim 2;

said first terminal of said first and second coupler circuits being interconnected and said second terminal of said first and second coupler circuits being interconnected;

said first transistor of said first circuit and said second transistor of said second circuit being of the samd conductivity type.

* * * * *